(12) United States Patent
Goodbred

(10) Patent No.: US 6,761,407 B1
(45) Date of Patent: Jul. 13, 2004

(54) VEHICLE-SEAT ASSEMBLY

(75) Inventor: Neil Gentry Goodbred, Northville, MI (US)

(73) Assignee: Lear Corporation, Southfield, MI (US)

( * ) Notice: Subject to any disclaimer, the term of this patent is extended or adjusted under 35 U.S.C. 154(b) by 0 days.

(21) Appl. No.: 10/462,393

(22) Filed: Jun. 16, 2003

(51) Int. Cl.$^7$ .................................................. A47C 1/02
(52) U.S. Cl. ................................................ 297/344.1
(58) Field of Search ..................... 297/344.1; 248/429

(56) References Cited

U.S. PATENT DOCUMENTS

| | | | |
|---|---|---|---|
| 4,993,679 A | * 2/1991 | Urai et al. | 248/429 |
| 5,058,829 A | 10/1991 | Bentley | 244/122 |
| 5,286,076 A | * 2/1994 | DeVoss et al. | 296/65.14 |
| 5,762,296 A | 6/1998 | Gilbert | 244/118.1 |
| 6,036,267 A | * 3/2000 | Downey et al. | 297/341 |
| 6,227,619 B1 | 5/2001 | Pesta et al. | 197/378.12 |
| 6,318,696 B1 | * 11/2001 | Downey et al. | 248/430 |
| 6,322,035 B1 | * 11/2001 | D'Antimo et al. | 248/429 |
| 6,322,036 B1 | 11/2001 | Tame et al. | 248/429 |
| 6,354,553 B1 | * 3/2002 | Lagerweij et al. | 248/430 |
| 6,361,098 B1 | 3/2002 | Pesta et al. | 296/65.03 |
| 6,616,233 B1 | * 9/2003 | Debus et al. | 297/341 |
| 2002/0079418 A1 | 6/2002 | Tame et al. | |

* cited by examiner

Primary Examiner—Milton Nelson, Jr.
(74) Attorney, Agent, or Firm—Bliss McGlynn, P.C.; Bill Panagos

(57) ABSTRACT

A vehicle-seat assembly includes a pair of elongated outer tracks operatively fixed to the floor pan of the vehicle in spaced relationship with respect to each other, a seat riser, and a pair of elongated inner track assemblies operatively connected to the seat riser. Each inner track assembly is supported in sliding relationship with a corresponding outer track to slidably mount the seat riser on the floor pan. A pair of trigger mechanisms is supported for pivotal movement relative to a corresponding inner track assembly and adapted to releasably engage a corresponding outer track. A release mechanism is connected to the trigger mechanisms and operable to be manually movable to pivot the trigger mechanisms so as to engage and disengage the trigger mechanisms relative to the outer tracks to facilitate adjustable sliding movement of the inner track assemblies relative to the outer tracks. A clip is mounted to each trigger mechanism at the interface of the trigger mechanism and a corresponding inner track assembly and provides a noise-insulating interface between the trigger mechanism and the corresponding inner track assembly.

19 Claims, 2 Drawing Sheets

VEHICLE-SEAT ASSEMBLY

BACKGROUND OF THE INVENTION

1. Field of the Invention

The present invention relates, generally, to a vehicle-seat assembly and, more particularly, to a vehicle seat assembly having an anti-rattle trigger mechanism used to adjust the position of the seat in the fore and aft directions.

2. Description of the Related Art

Vehicle-seat assemblies that provide manual fore-and-aft adjustment of a seat body generally include an elongated, channel-shaped outer track on each side of the assembly that are fixed to the floor of the vehicle. The assembly generally also includes a pair of elongated, opposed, spaced-apart inner tracks mounted on each side of the seat body. The inner tracks are slidably retained within the channel defined by the corresponding outer tracks. To restrain undesired fore-and-aft movement of the seat body, a series of apertures, notches, detents, or other retaining mechanisms are usually provided in the outer tracks in 10 mm increments, for example. The apertures, notches, or detents are selectively engaged by a locking mechanism connected to each of the pairs of inner tracks.

More specifically, the locking mechanism is often pivotally mounted to the pair of inner tracks. The locking mechanism normally engages in one or more of the apertures, for example, to positively prevent sliding movement of the inner tracks and, thus, the seat body relative to the outer tracks. A release handle may be operatively connected to the locking mechanisms. The handle may be actuated to move the locking mechanisms out of engagement with their respective retaining mechanism to permit sliding movement of the inner tracks and, thus, the seat body relative to the outer tracks to a desired position along the outer tracks. The handle may then be released at the desired position so that the locking mechanism engages different retaining mechanisms to again positively prevent sliding movement of the inner tracks and, thus, the seat body relative to the outer tracks.

The tracks and the locking mechanisms are typically made of metal and closely juxtaposed relative to one another. Thus, the locking mechanism and inner and outer tracks must function in relatively tight spaces. Unfortunately, it is not uncommon for metal-to-metal contact to occur between the movable locking mechanisms and the inner tracks of the seat assembly. This contact causes unwanted noise, such as rattle. Thus, there is a need in the related art for a vehicle-seat assembly having a manually actuated adjustment mechanism that does not rattle, in general. Furthermore, there remains a need in the art for such a device that prevents rattling of the locking mechanisms of the assembly, in particular.

SUMMARY OF THE INVENTION

The present invention overcomes the disadvantages in the related art in a vehicle-seat assembly including a pair of elongated outer tracks operatively fixed to the floor pan of the vehicle in spaced relationship with respect to each other, a seat riser, and a pair of elongated inner track assemblies operatively connected to the seat riser. Each inner track assembly is supported in sliding relationship with a corresponding outer track to slidably mount the seat riser on the floor pan. A pair of trigger mechanisms is supported for pivotal movement relative to a corresponding inner track assembly and adapted to releasably engage a corresponding outer track. A release mechanism is connected to the trigger mechanisms and operable to be manually movable to pivot the trigger mechanisms so as to engage and disengage the trigger mechanisms relative to the outer tracks to facilitate adjustable sliding movement of the inner track assemblies relative to the outer tracks. A clip is mounted to each trigger mechanism at the interface of the trigger mechanism and a corresponding inner track assembly and provides a noise-insulating interface between the trigger mechanism and the corresponding inner track assembly.

One advantage of the vehicle-seat assembly of the present invention is that it prevents rattling of the trigger mechanisms upon fore-and-aft adjustment of the seat body and/or operation of the vehicle.

Another advantage of the vehicle-seat assembly of the present invention is that it permits pure pivoting of the trigger mechanisms upon fore-and-aft adjustment of the seat body and/or operation of the vehicle.

Another advantage of the vehicle-seat assembly of the present invention is that it prevents wobbling of the trigger mechanisms upon fore-and-aft adjustment of the seat body and/or operation of the vehicle.

Still another advantage of the vehicle-seat assembly of the present invention is that it prevents metal-to-metal contact of the trigger mechanisms and inner tracks upon fore-and-aft adjustment of the seat body and/or operation of the vehicle.

Other objects, features, and advantages of the present invention will be readily appreciated as the same becomes better understood while reading the subsequent description taken in conjunction with the accompanying drawings.

DETAILED DESCRIPTION OF THE INVENTION

Figure 1:
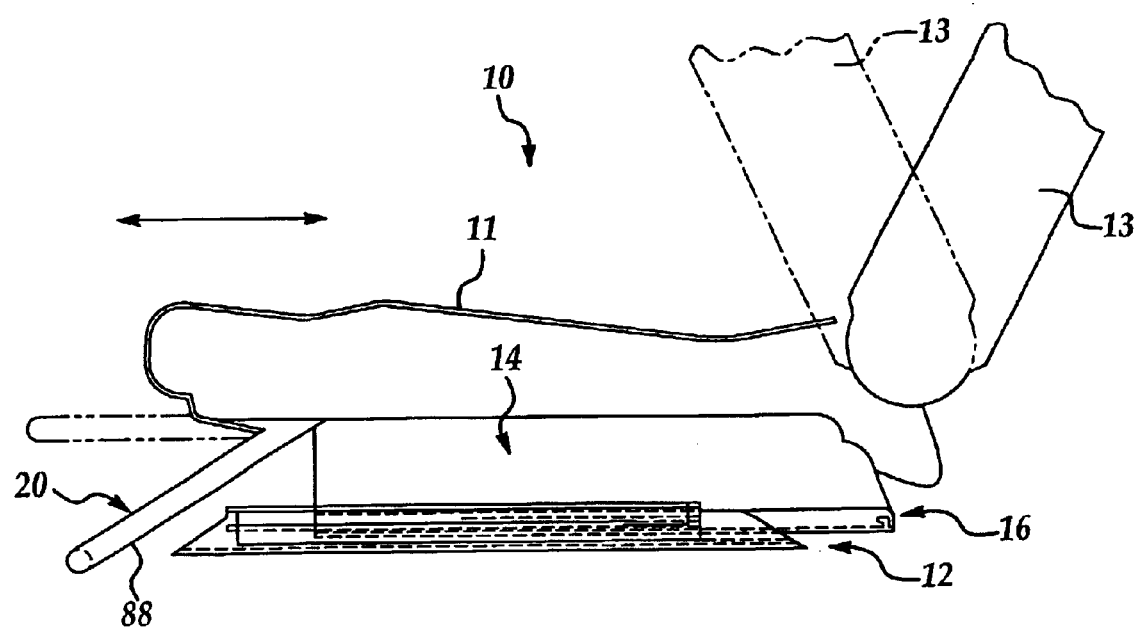
FIG. 1 is a side view of a vehicle-seat assembly of the present invention.

A vehicle-seat assembly of the present invention is generally indicated at 10 in FIG. 1, where like numerals are used to designate like structure throughout the drawings. The seat assembly 10 includes a seat cushion 11 and a seat back 13 pivotally mounted relative to the seat cushion 11. Certain aspects of a known and generally constructed vehicle-seat assembly are described in detail below. However, those having ordinary skill in the art will appreciate that the vehicle seat assembly illustrated in the drawings is merely one illustrative example of suitable structure to which the novel aspect of the vehicle-seat assembly 10 may be applied.

Figure 2:
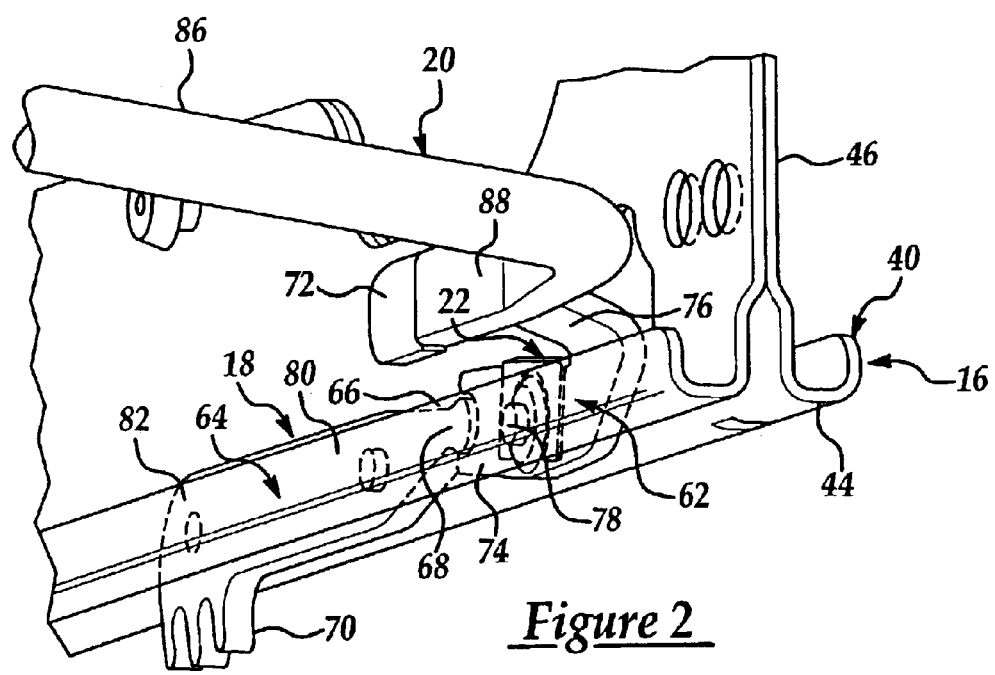
FIG. 2 is a partial perspective view of the vehicle-seat assembly of the present invention showing a pair of inner track assemblies, a trigger mechanism, and the release handle in structural relationship with respect to each other.
Figure 3:
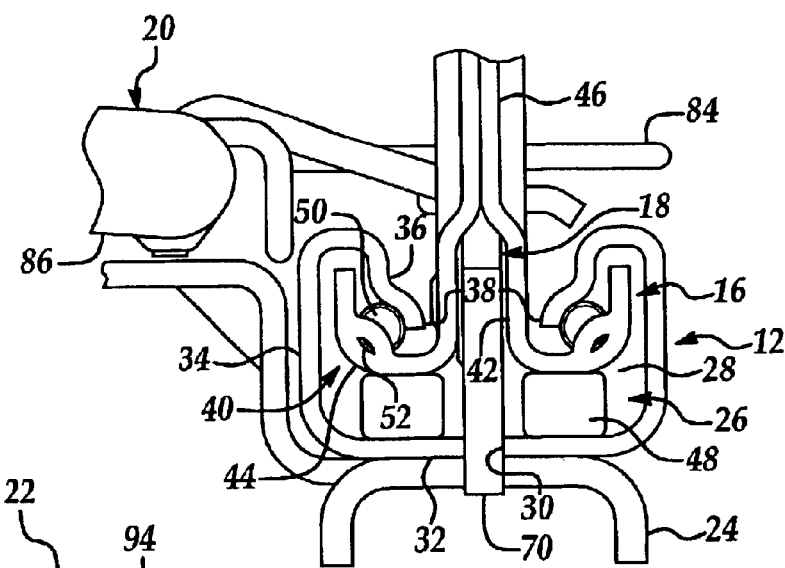
FIG. 3 is a partial end view of the vehicle-seat assembly of the present invention showing an outer track, a pair of inner track assemblies, a trigger mechanism, and the release handle in structural relationship with respect to each other.

In general and as shown in FIGS. 1–3, the vehicle-seat assembly 10 includes a pair of elongated outer tracks, generally indicated at 12 operatively fixed to the floor pan of the vehicle in spaced relationship with respect to each other. The vehicle-seat assembly 10 also includes a seat riser, generally indicated at 14, and a pair of elongated inner track assemblies, generally indicated at 16, operatively connected to the seat riser 14. The vehicle seat cushion 11 is supported by the riser 14. Each inner track assembly 16 is supported in sliding relationship with a corresponding outer track 12 to slidably mount the seat riser 14 on the floor pan. The vehicle-seat assembly 10 also includes a pair of trigger mechanisms, generally indicated at 18 in FIGS. 4A–4D. The pair of trigger mechanisms 18 is supported for pivotal movement relative to a corresponding inner track assembly 16 and adapted to releasably engage a corresponding outer track 12. A release mechanism, generally indicated at 20, is connected to the trigger mechanisms 18 and operable to be manually movable to pivot the trigger mechanisms 18 so as to engage and disengage the trigger mechanisms 18 relative to the outer tracks 12 to facilitate adjustable sliding movement of the inner track assemblies 16 relative to the outer tracks 12. A clip, generally indicated at 22 in FIGS. 4A–4D and 5, is mounted to each trigger mechanism 18 at the interface of the trigger mechanism 18 and a corresponding inner track assembly 16 and provides a noise-insulating interface between the trigger mechanism 18 and the corresponding inner track assembly 16, as will be described in greater detail below.

The seat riser 14, as shown in FIG. 1, is generally known in the vehicle art and, therefore, will not be described in detail. The outer tracks 12, inner track assemblies 16, trigger mechanism 18, release mechanism 20, and clip 22 will now be described in greater detail in connection with a preferred embodiment of the vehicle-seat assembly 10.

The outer tracks 12 are substantially parallel, co-planar, and co-extensive with respect to each other. As shown in FIG. 3, each outer track 12 is fixed to a support bracket 24, which is fixed to the body of the vehicle, in general, and the floor pan, in particular. The outer track 12 has a substantially U-shaped channel, generally indicated at 26, defining a space 28 therein and includes a series of retaining members 30, as shown in FIG. 3, positioned at substantially regular intervals along the outer track 12.

More specifically, the outer track 12 has a base 32; two side walls 34; and two upper, inwardly and downwardly extending portions 36 that define a substantially central, elongated slot 38 therebetween. The base 32 includes the series of retaining members 30—such as apertures 30 formed therein or notches 30 or detents 30 formed thereon—positioned at substantially regular intervals along the base 32 and the function of which will be described in detail below.

The inner track assemblies 16 are substantially parallel, co-planar, and co-extensive with respect to each other and substantially parallel and co-extensive with respect to the outer tracks 12. As shown in FIGS. 2 and 3, each inner track assembly 16 includes a pair of J-shaped members, generally indicated at 40, fixedly attached to one another in back-to-back relation and slidably received within the channel 26 of a corresponding pair of outer tracks 12. The J-shaped members 40 are substantially parallel, co-planar, and co-extensive with respect to each other and define an elongated passageway 42 therebetween. As will be discussed in detail below, a corresponding trigger mechanism 18 is supported for pivotal movement relative to the J-shaped members 40 within the passageway 42.

More specifically, each J-shaped member 40 has a head 44 and a stem 46 extending upwardly from the head 44. As shown in FIG. 3, the head 44 is slidably received through the slot 38 and within the space 28 adjacent a corresponding portion 36 of an outer track 12. The heads 44 define the passageway 42 therebetween. The passageway 42 has a clearance of approximately 5 mm. The stems 46 are operatively connected to the seat riser 14.

The inner track assembly 16 is slidably supported within a corresponding outer track 12 by rollers 48 that run between the head 44 of each J-shaped member 40 and the base 32 of the outer track 12. To prevent rattling, the inner track assembly 16 is also pre-loaded with at least one ball bearing 50 positioned in a race 52 defined generally between the head 44 of each J-shaped member 40 and the corresponding portion 36.

Each trigger mechanism 18 is substantially longitudinally situated within the space 28 of a corresponding outer track 12 and the passageway 42 defined between the heads 44 of corresponding J-shaped members 40. The trigger mechanism 18 is also pivotally supported for substantially vertical pivotal movement relative to a corresponding inner track assembly 16, in general, and between the corresponding J-shaped members 40, in particular. The trigger mechanism 18 has a thickness of approximately 3.5 mm, resulting in a clearance between the trigger mechanism 18 and the corresponding J-shaped members 40 of approximately 1.5 mm.

Also and as best shown in FIGS. 4A–4D, the trigger mechanism 18 has first and second sides 54, 56, respectively. A substantially cylindrical boss 58 is formed on and extends from the first side 54. On the other hand, a substantially cylindrical depression 60 is formed on the second side 56 opposite the boss 58 and extends in the direction of the boss 58. The trigger mechanism 18 is supported for pivotal movement by the corresponding inner track assembly 16 about an axis "A" extending in the direction of the boss 58.

More specifically and as shown in FIG. 2, the trigger mechanism 18 includes a trigger lever, generally indicated at 62, and a trigger, generally indicated at 64, operatively connected to the trigger lever 62. As shown in FIGS. 2 and 4A–4D, the trigger lever 62 includes a socket 66 defined at one end thereof. The trigger 64 includes a head 68 that is cooperatively received in the socket 66 to create a pivot joint enabling clockwise rotation of the trigger 64 in response to counter-clockwise rotation of the trigger lever 62. The trigger 64 further includes at least one substantially downwardly extending engagement member 70, as shown also in FIG. 3, but preferably a plurality of engagement members, adapted to be releasably engaged with at least one retaining member 30 of a corresponding outer track 12 to prevent relative sliding movement of the outer track 12 and a corresponding inner track assembly 16.

As shown in FIG. 2, the trigger lever 62 also has a first end 72, a second end 74, and an offset flange 76 disposed between the first and second ends 72, 74, respectively. The trigger lever 62 is pivotally connected to and between corresponding J-shaped members 40 by a pivot pin 78, also shown in FIGS. 4A and 4B, for substantially vertical pivotal movement about the axis "A." The pivot pin 78 and the boss 58 are disposed in contacting and substantially concentric relationship with respect to each other and substantially midway between the flange 76 and the second end 74 of the trigger lever 62.

The trigger 64 extends from the second end 74 of the trigger lever 62 and has a first end 80 and a second end 82. The second end 74 of the trigger lever 62 has the socket 66, and the first end 80 of the trigger 64 has the head 68 that is cooperatively received in the socket 66 to create clockwise pivotal rotation of the trigger 64 in response to counterclockwise pivotal rotation of the trigger lever 62.

The second end 82 of the trigger 64 includes the engagement members 70, which may include locking teeth, adapted to be engagingly received within the apertures 30, for example, of the base 32 of a corresponding outer track 12. The teeth 70 normally engage into adjacent apertures 30 to prevent relative sliding movement of the outer tracks and inner track assemblies 12, 16, respectively. The trigger 64 is biased downwardly into an engaged position by a spring 84, as shown in FIG. 3, that is, in turn, connected to the release mechanism 20, which will be described in greater detail below.

As shown in FIGS. 1–3, the release mechanism 20 defines a handle that extends generally forwardly from the seat riser 14. The release handle 20 is generally U-shaped and includes a base 86 and a leg 88 extending substantially perpendicularly from each end of the base 86. The base 86 extends across the width of the seat riser 14, and each leg 88 is connected to the first end 72 of a corresponding trigger lever 62 such that movement of the release handle 20 causes the trigger mechanisms 18 to vertically pivot simultaneously. The release handle 20 is pivotally movable downwardly and upwardly, for instance, between an engaged position and a disengaged position, respectively.

Figure 4A:
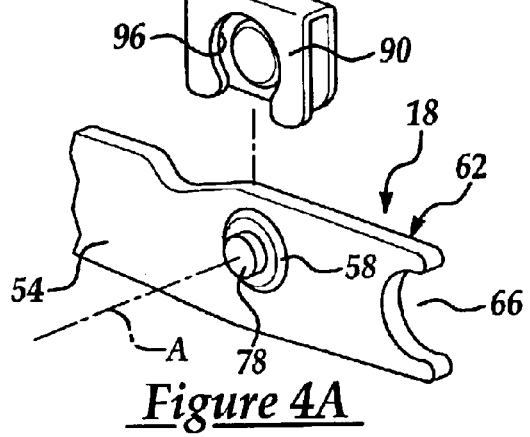
FIG. 4A is a front exploded view of a portion of a trigger lever and a clip of the vehicle-seat assembly of the present invention.
Figure 4B:
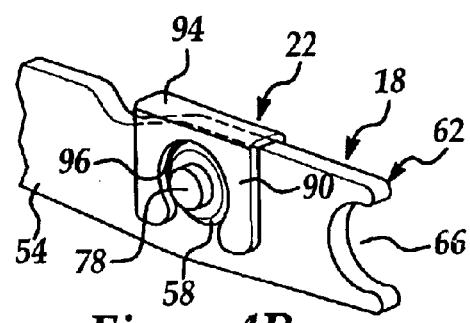
FIG. 4B is a front view of a portion of a trigger lever of the vehicle-seat assembly of the present invention showing a clip mounted thereto.
Figure 4C:
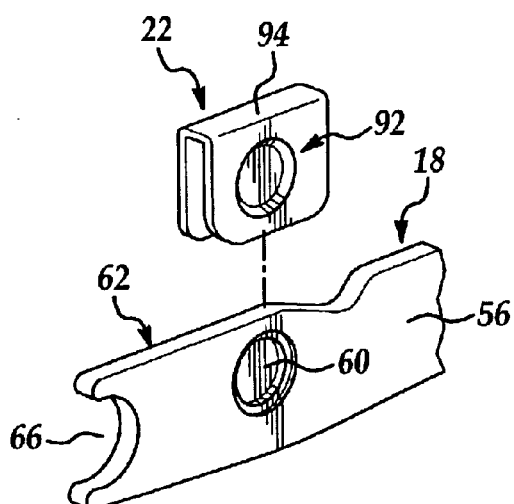
FIG. 4C is a rear exploded view of a portion of a trigger lever and a clip of the vehicle-seat assembly of the present invention.
Figure 4D:
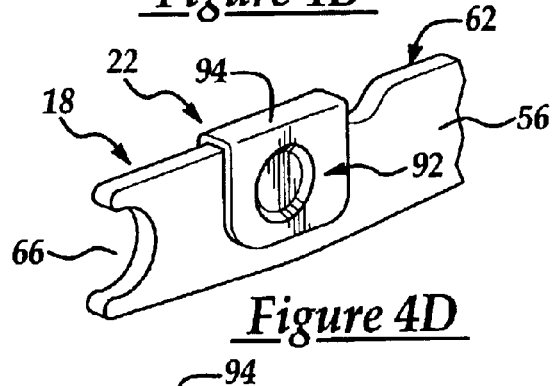
FIG. 4D is a rear view of a portion of a trigger lever of the vehicle-seat assembly of the present invention showing a clip mounted thereto.
Figure 5:
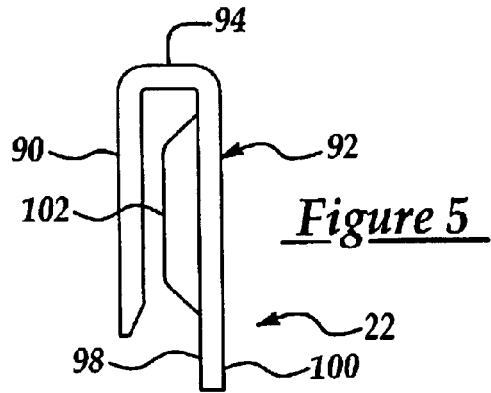
FIG. 5 is a side view of a clip of the vehicle-seat assembly of the present invention.

As best shown in FIGS. 4A–4D and 5, the clip 22 is of a substantially rectangular shape and has a first side 90 and a second side, generally indicated at 92, spaced from the first side 90. A bridge 94 connects the first and second sides 90, 92, respectively. The first and second sides 90, 92 are disposed substantially parallel with respect to each other and substantially perpendicular to the bridge 94. Also, the first and second sides 90, 92 and the bridge 94 are disposed substantially co-extensively with respect to each other in the longitudinal direction. And, as best shown in FIG. 5, the second side 92 extends a greater distance in the lateral direction than does the first side 90. Further, as best shown in FIGS. 4A 4D, the corners of each of the first and second sides 90, 92, respectively, opposite the bridge 94 are substantially arcuate.

As best shown in FIGS. 4A and 4B, a substantially central portion of the first side 90 of the clip 22 includes a recess 96 extending from the terminal end of the first side 90 toward the bridge 94 such that a substantially central part of the terminal end is open. The recess 96 is adapted to accommodate the boss 58 and pivot pin 78 formed on the first side 54 of the trigger lever 62.

As best shown in FIG. 5, the second side 92 defines a first face 98, a second face 100, and a substantially frustoconically shaped projection 102 extending in a tapered manner from a substantially central portion of the first face 98 toward the first side 90. As shown in FIGS. 4C and 4D, the projection 102 is adapted to be matingly received by the depression 60 of the trigger lever 62. Preferably, the clip 22 has a thickness of approximately 1.1 mm. The clip 22 is preferably made of high-impact polystyrene by injection-molding.

As best shown in FIG. 3, the first side 90 is disposed between the first side 54 of the trigger lever 62 and the back of one of a corresponding pair of J-shaped members 40. More specifically, the first side 90 is mounted to the trigger lever 62 about the pivot point. The second side 92 is disposed between the second side 56 of the trigger lever 62 and the back of the other of the corresponding pair J-shaped members.

In use, if it is required to adjust the longitudinal position of the seat riser 14 with respect to the outer tracks 12, the release handle 20 is pulled upwardly, for instance, out of the engaged position into the disengaged position. This results in counterclockwise rotation of the trigger lever 62 and, in turn, clockwise rotation of the trigger 64, moving the trigger 64 from the engaged position to the disengaged position in which the teeth 70 no longer engage with the apertures 30. The seat riser 14 can then be moved to a desired position and the handle 20 released by the operator, thus returning the trigger 64 to the engaged position when the teeth 70 are in registry with the apertures 30 under action of the spring 84 on the trigger 64.

When a clip 22 is mounted upon the trigger lever 62, the clearance between the trigger lever 62 and a corresponding pair of J-shaped members 40 is reduced to approximately 0.4 mm. This reduction in clearance minimizes or eliminates the likelihood of rattle of the trigger lever 62 as a result of the relatively large amount of such clearance in the vehicle-seat assemblies of the related art. Also, since the clip 22 is plastic, the likelihood of such rattle is also minimized or eliminated by removing any metal-to-metal contact between the trigger lever 62 and the J-shaped members 40.

Accordingly, upon fore-and-aft adjustment of the seat riser 14 and/or operation of the vehicle, the clip 22 prevents rattling of the trigger mechanisms 18, wobbling of the trigger mechanisms 18, and metal-to-metal contact of the trigger mechanisms 18 and inner track assemblies 16. The clip 22 also facilitates pure pivoting of the trigger mechanisms 18.

The invention has been described in an illustrative manner. It is to be understood that the terminology that has been used is intended to be in the nature of words of description rather than of limitation. Many modifications and variations of the invention are possible in light of the above teachings. Therefore, within the scope of the appended claims the invention may be practiced other than as specifically described.

What is claimed is:

1. A vehicle-seat assembly adapted to be operatively fixed to a floor pan of a vehicle, said assembly comprising:

a pair of elongated outer tracks adapted to be operatively fixed to the floor pan of the vehicle in spaced relationship with respect to each other;

a seat riser and pair of elongated inner track assemblies operatively connected to said seat riser, each of said pair of inner track assemblies supported in sliding relationship with a corresponding one of said pair of outer tracks to slidably mount said seat riser on the floor pan;

a pair of trigger mechanisms supported for pivotal movement relative to a corresponding one of said pair of inner track assemblies and adapted to releasably engage a corresponding one of said pair of outer tracks;

a release mechanism connected to said pair of trigger mechanisms, said release mechanism operable to be manually movable to pivot said pair of trigger mechanisms so as to engage and disengage said pair of trigger mechanisms relative to said pair of outer tracks to facilitate adjustable sliding movement of said pair of inner track assemblies relative to said pair of outer tracks; and a clip mounted to each of said pair of trigger mechanisms at the interface of said trigger mechanism and a corresponding one of said pair of inner track assemblies, said clip providing a noise-insulating interface between said trigger mechanism and the corresponding one of said pair of inner track assemblies.

2. A vehicle-seat assembly as recited in claim 1, wherein said clip is made of high-impact polystyrene.

3. A vehicle-seat assembly as recited in claim 1, wherein each of said trigger mechanisms has a thickness of approximately 3.5 mm.

4. A vehicle-seat assembly as recited in claim 1, wherein said clip has a thickness of approximately 1.1 mm.

5. A vehicle-seat assembly as set forth in claim 1, wherein each of said pair of outer tracks has a substantially U-shaped channel and includes a series of retaining members positioned at substantially regular intervals along said outer track.

6. A vehicle-seat assembly as set forth in claim 5, wherein each of said pair of trigger mechanisms includes a trigger lever and a trigger, said trigger lever including a socket defined at one end thereof, said trigger including a head that is cooperatively received in said socket to create a pivot joint enabling clockwise rotation of said trigger in response to counter-clockwise rotation of said trigger lever, said trigger further including at least one engagement member adapted to be releasably engaged with at least one of said retaining members of a corresponding one of said pair of outer tracks to prevent relative sliding movement of said pair of outer tracks and inner track assemblies.

7. A vehicle-seat assembly as set forth in claim 5, wherein each of said pair of inner track assemblies includes a pair of J-shaped members fixedly attached to one another in back-to-back relation and slidably received within said U-shaped channel of a corresponding one of said pair of outer tracks.

8. A vehicle-seat assembly as set forth in claim 7, wherein said pair of J-shaped members define an elongated passageway therebetween, a corresponding one of said pair of trigger mechanisms being supported for pivotal movement relative to said pair of J-shaped members within said passageway.

9. A vehicle-seat assembly as set forth in claim 7, wherein each of said pair of trigger mechanisms has first and second sides, a boss formed on and extending from said first side, and a depression formed on said second side and extending in the direction of said boss, each of said pair of trigger mechanisms supported for pivotal movement by a corresponding one of said pair of inner track assemblies about an axis extending in the direction of said boss.

10. A vehicle-seat assembly as recited in claim 9, wherein said clip includes a body having a first side, a second side spaced from said first side, and a bridge connecting said first and second sides.

11. A vehicle-seat assembly as recited in claim 10, wherein said first and second sides of said clip are disposed substantially parallel with respect to each other and substantially perpendicular to said bridge.

12. A vehicle-seat assembly as recited in claim 10, wherein said second side of said clip defines first and second faces and a substantially frusto-conically shaped projection extending in a tapered manner from a substantially central portion of said first face toward said first side of said clip and adapted to be matingly received by said depression of a corresponding one of said pair of trigger mechanisms.

13. A vehicle-seat assembly as recited in claim 10, wherein said first side of said clip is disposed between said first side of a corresponding one of said pair of trigger mechanisms and the back of a corresponding one of said pair of J-shaped members and said second side of said clip is disposed between said second side of the corresponding one of said pair of trigger mechanisms and the back of the corresponding other of said pair of J-shaped members.

14. A vehicle-seat assembly as recited in claim 10, wherein said second side of said clip extends a greater distance in the lateral direction than does said first side of said clip.

15. A vehicle-seat assembly as recited in claim 10, wherein said first and second sides of said clip and said bridge are disposed substantially coextensively with respect to each other in the longitudinal direction.

16. A vehicle-seat assembly as recited in claim 10, wherein said clip is of a substantially rectangular shape such that it defines four corners.

17. A vehicle-seat assembly as recited in claim 16, wherein the corners of each of said first and second sides of said clip opposite said bridge are substantially arcuate.

18. A vehicle-seat assembly as set forth in claim 10, wherein said first side of said clip includes a recess extending from the terminal end of said first side toward said bridge, said recess adapted to accommodate said boss formed on said first side of a corresponding one of said pair of trigger mechanisms.

19. A vehicle-seat assembly as recited in claim 18, wherein a substantially central part of the terminal end is open.

* * * * *